US011412662B2

(12) United States Patent
Hallale et al.

(10) Patent No.: US 11,412,662 B2
(45) Date of Patent: Aug. 16, 2022

(54) NEEDLE FRAME YOKE AND ARM ASSEMBLY FOR AGRICULTURAL MACHINE

(71) Applicant: Deere & Company, Moline, IL (US)

(72) Inventors: Sanjeev M. Hallale, Pune (IN); Mohamad S. El-Zein, Bettendorf, IA (US); Nathan F. Tortorella, Bettendorf, IA (US); Hema V. Guthy, Moline, IL (US); Sankaran Subramaniam, Bettendorf, IA (US); Hector Portillo, Monterrey (MX); Darin L. Roth, Batavia, IA (US); Mark A. Pieper, Ottumwa, IA (US); Todd C. Aeschliman, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 626 days.

(21) Appl. No.: 16/459,018

(22) Filed: Jul. 1, 2019

(65) Prior Publication Data
US 2021/0000016 A1    Jan. 7, 2021

(51) Int. Cl.
*A01F 15/07* (2006.01)
*A01F 15/08* (2006.01)
*A01F 15/04* (2006.01)
*A01D 59/06* (2006.01)
*A01F 15/14* (2006.01)

(52) U.S. Cl.
CPC ............ *A01F 15/071* (2013.01); *A01D 59/06* (2013.01); *A01F 15/04* (2013.01); *A01F 15/08* (2013.01); *A01F 2015/073* (2013.01); *A01F 2015/143* (2013.01)

(58) Field of Classification Search
CPC ........ A01F 15/071; A01F 15/08; A01F 15/04; A01F 15/12; A01F 2015/073; A01F 2015/143; A01D 59/06; F16B 2/065; F16B 7/048; F16B 7/00; F16B 7/04
USPC .................................................. 100/19 R, 24
See application file for complete search history.

(56) References Cited

U.S. PATENT DOCUMENTS

| 3,027,825 A | 4/1962 | Nolt et al. |
| 3,036,514 A | 5/1962 | Mcduffie |
| 3,211,084 A * | 10/1965 | Barfield ................. A01F 15/12 100/24 |

(Continued)

FOREIGN PATENT DOCUMENTS

| DE | 20203060 U1 | 7/2003 |
| EP | 2198687 A1 | 6/2010 |

(Continued)

OTHER PUBLICATIONS

European Search Report issued in counterpart application No. 20181687.3 dated Dec. 4, 2020 (05 pages).

*Primary Examiner* — Jimmy T Nguyen
(74) *Attorney, Agent, or Firm* — Michael Best & Friedrich LLP

(57) ABSTRACT

An agricultural harvesting machine includes a binding mechanism to secure binding material around a crop package and a delivery device to wrap binding material around a portion of the crop package and provide binding material to the binding mechanism. The delivery device includes a needle connected to a needle frame. The needle frame includes a yoke connected a first arm.

20 Claims, 15 Drawing Sheets

(56) References Cited

U.S. PATENT DOCUMENTS

| | | | |
|---|---|---|---|
| 3,550,969 A * | 12/1970 | Robinson | F16B 7/0493 |
| | | | 403/392 |
| 4,102,261 A | 7/1978 | White | |
| 4,310,186 A | 1/1982 | Vansteelant | |
| 5,156,085 A | 10/1992 | Bossche | |
| 7,458,620 B2 * | 12/2008 | Rotole | A01F 15/12 |
| | | | 289/16 |
| 9,936,646 B2 | 4/2018 | Demulder et al. | |
| 2013/0118366 A1 | 5/2013 | Esau et al. | |
| 2018/0098501 A1 | 4/2018 | Kraus | |
| 2018/0098506 A1 | 4/2018 | Kraus | |
| 2018/0116123 A1 | 5/2018 | Chaney | |
| 2019/0000017 A1 | 1/2019 | Kreyenhagen | |

FOREIGN PATENT DOCUMENTS

| | | |
|---|---|---|
| EP | 3020268 A1 | 5/2016 |
| EP | 3315017 A1 | 5/2018 |
| EP | 3391728 A1 | 10/2018 |

* cited by examiner

NEEDLE FRAME YOKE AND ARM ASSEMBLY FOR AGRICULTURAL MACHINE

FIELD

The present disclosure relates to agricultural harvesting machines having a binding system for securing binding material around a crop package.

BACKGROUND

Agricultural balers gather, compress, and shape crop material into a bale. There are different types of balers which create rectangular or square bales or cylindrical or round bales. Bales can be bound with netting, strapping, wire, or twine. A baler that produces small rectangular bales is often referred to as a square baler. Another type of baler is one that produces large rectangular bales, often referred to as large square baler.

Large square balers have been used in crop harvesting for many years. Large square balers usually utilize a compression system including a gearbox with a crank arm and connecting rod which is attached to a plunger. During each rotation of the crank arm, the plunger compresses the crop in a baling chamber as the plunger moves towards the rear of the baler. Crop is usually metered from a pre-compression chamber into the baler chamber. Large square balers usually include a knotter system for tying twine around the bale before the bale is ejected from the baler chamber. Needles delivery twine through the baling chamber to the knotter system.

The need for increased productivity is motivation to develop faster, more efficient equipment. Designing machines with relatively low density materials, such as Aluminum, can enable drastic improvements in efficiency. In a large square baler, the binding system accelerates from rest very quickly, followed by braking system at the peak of the stroke. Light weight designs will reduce the power required to operate this system. The drive mechanism and braking system may be simplified and minimized. The baler may be also driven at a faster rate because the binding system can move at a faster rate.

SUMMARY

According to some embodiments, an agricultural harvesting machine includes a binding mechanism to secure binding material around a crop package and a delivery device to wrap binding material around a portion of the crop package and provide binding material to the binding mechanism. The delivery device includes a needle connected to a needle frame. The needle frame includes a yoke and a first arm. The yoke includes a central section, an upper bar extending from the central section, and a lower bar extending from the central section. The first arm includes a main body and a yoke receiving portion. The yoke receiving portion includes a front flange connected to the yoke and a rear flange separately couple to the yoke.

According to some embodiments, an agricultural harvesting machine includes a binding mechanism to secure binding material around a crop package and a delivery device to wrap binding material around a portion of the crop package and provide binding material to the binding mechanism. The delivery device includes a needle connected to a needle frame. The needle frame includes a yoke extending between a first arm and a second arm. The yoke includes an upper bar having a longitudinal first chamber, a lower bar having a longitudinal second chamber, and a central section positioned between the upper bar and the lower bar. The first arm includes a main body and a yoke receiving portion. The yoke receiving portion includes a front flange connected to the upper bar by a first fastener and connected to the lower bar by a second fastener and a rear flange connected to the central section by a third fastener.

According to some embodiments, an agricultural harvesting machine includes a binding mechanism to secure binding material around a crop package and a delivery device to wrap binding material around a portion of the crop package and provide binding material to the binding mechanism. The delivery device includes a needle connected to a needle frame. The needle frame includes a yoke extending between a first arm and a second arm. The yoke has a substantially D-shaped configuration with a curvilinear front portion facing the needle and a rectilinear rear portion opposite the front portion. The first arm includes a main body and a yoke receiving portion. The yoke receiving portion includes a front flange having a curvilinear section receiving the front portion and a rear flange connected to the rear portion.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Figure 1:
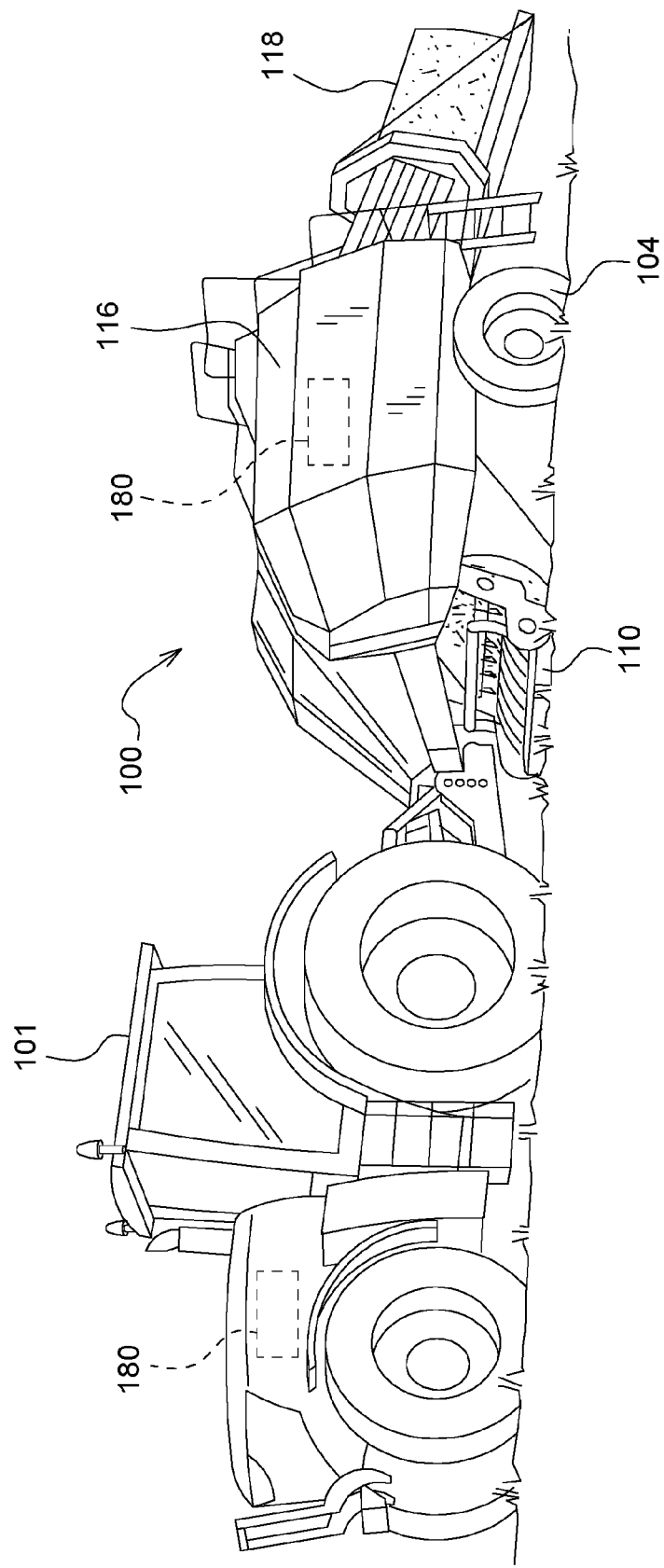
FIG. 1 is a perspective view of an agricultural harvesting machine couple to an agricultural vehicle.

FIG. 1 illustrates an agricultural harvesting machine 100, such as a baler, according to one exemplary embodiment.

Although a large square baler is shown, this disclosure also applies to other balers and harvesting machines. An agricultural vehicle 101, such as a tractor, can be connected to the agricultural harvesting machine 100 or the agricultural harvesting machine 100 can be self-propelled. The agricultural harvesting machine 100 can be combined or integrated with a cotton harvester, a combine, or other harvesting machines. The agricultural harvesting machine 100 and the agricultural vehicle 101 can each include an electronic control unit 180, or controller, having one or more microprocessor-based electronic control units or controllers, which perform calculations and comparisons and execute instructions. The controller 180 may include a processor, a core, volatile and non-volatile memory, digital and analog inputs, and digital and analog outputs. For ease of reference, the remaining description will refer to the agricultural harvesting machine 100 as a baler. As depicted in FIG. 1, the baler 100 may move across a field and gather and process crop material to form a crop package 118, such as a bale. The baler 100 may then eject the bale 118 from the rear of the baler 100.

Figure 2:
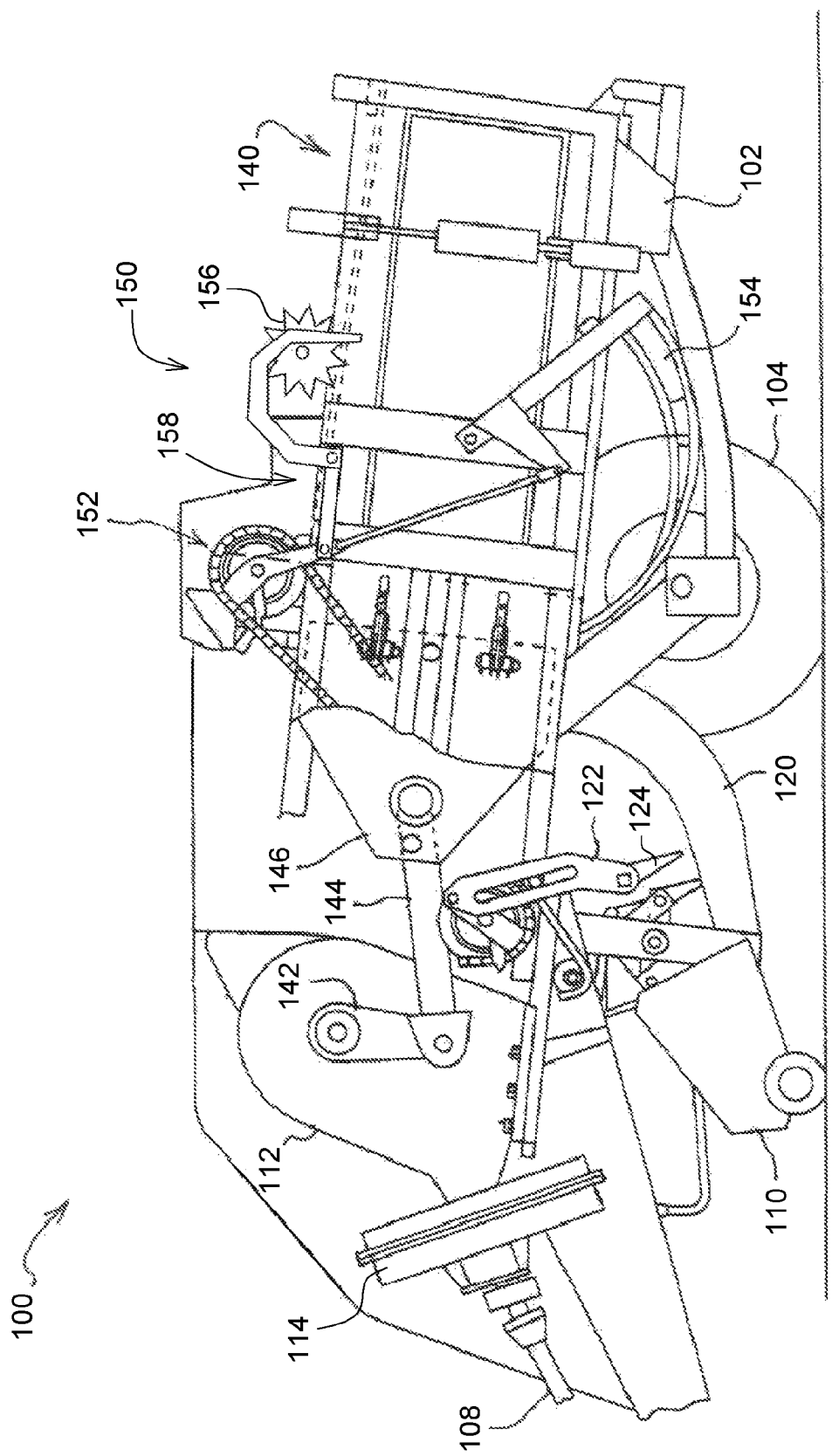
FIG. 2 is a schematic side view of the agricultural harvesting machine of FIG. 1.

As shown in FIG. 2, the baler 100 can include a frame 102, ground engaging devices 104, such as wheels, a hitch for attachment to a tractor or other vehicle, and an input shaft 108, such as a power-take-off (PTO) shaft, which can receive rotational power from a tractor 101, other vehicle agricultural vehicles, or other power sources. The baler 100 can include a pick-up mechanism 110 which gathers crop material from the ground surface and feeds it into the baler 100. The pick-up mechanism 110 can include various pick-up apparatus in including, but not limited to, tines, forks, augers, conveyors, baffles, a cutter or pre-cutter assembly, or any combination of the preceding. The baler 100 includes a housing 116, which generally shields various internal components of the baler 100. The input shaft or PTO shaft 108 can connect to an input of the gear train or transmission 112 providing rotational power to the baler 100 from the tractor 101 or other associated vehicle or power source. The transmission 112 can include a gearbox which converts the rotational motion of the input shaft 108 along a generally longitudinal axis of the baler 100 to a rotational motion along a generally transverse axis of the baler 100. A flywheel 114 can connect to the input shaft 108, the transmission 112, or both. The flywheel 114 can be positioned between the transmission 112 and the input shaft 108, as shown.

The baler 100 can include a pre-compression chamber 120 which receives crop material from the pick-up mechanism 110 and accumulates the crop material until a pre-determined fill condition. A loading mechanism 122, or stuffer, moves crop material into the pre-compression chamber 120. The loading mechanism 122 can include projections 124, such as tines or forks, which are inserted or extended into the pre-compression chamber 120, at or near the entrance, to move crop material into and through the pre-compression chamber 120. The projections 124 can then be removed or retracted from the pre-compression chamber 120, at or near the exit, and repositioned at or near the entrance of the pre-compression chamber 120.

The baler 100 can include a crank arm 142 connected to the rotational output of the transmission 112. A connecting link 144 can be connected between the crank arm 142 and a plunger 146. The connecting link 144 can include one or more members connecting the crank arm 142 to the plunger 146. The crank arm 142 rotates based upon the output of the transmission 112 and the plunger 146 moves in a reciprocal motion as the crank arm 142 rotates. The plunger 146 extends into the compression chamber 140 compressing the crop material and then at least partially retracts from the compression chamber 140 to allow more crop material to enter the compression chamber 140.

With reference to FIGS. 2-6, the baler 100 can include a binding or knotter system 150 which binds the compressed crop material in the compression chamber 140 into a crop package, such as a bundle or bale. The binding system 150 can include one or more binding or knotter mechanisms 152 and one or more corresponding delivery devices or needles 154, which can deliver binding material to the binding mechanisms 152. The binding system 150 wraps and secures a binding material around the compressed crop material, or crop package, during a binding operation. The baler 100 can include a measuring device 156, such as a star wheel, which measures the length of the compressed crop material within the compression chamber 140. The measuring device 156 activates the binding system 150 when the compressed crop material within the compression chamber 140 reaches a desired mass, size, or length. The measuring device 156 can activate the binding assembly 152 via a mechanical trip assembly 158.

When the binding assembly is activated, the one or more binding material needles 154 each move from a lowered position generally below or underneath the baler 100, shown for example in FIG. 4, to a raised position, as shown for example in FIG. 6. The binding material needles 154 pass through a slot 139 in the bottom of the compression chamber 140, a vertically extending slot 149 in the plunger 146, and a slot 141 in the top in of the compression chamber 140. The one or more needles 154 can deliver binding material, such as string or twine, to the binding mechanisms 152, which secures the binding material around the compressed crop material within the compression chamber 140.

Figure 3:
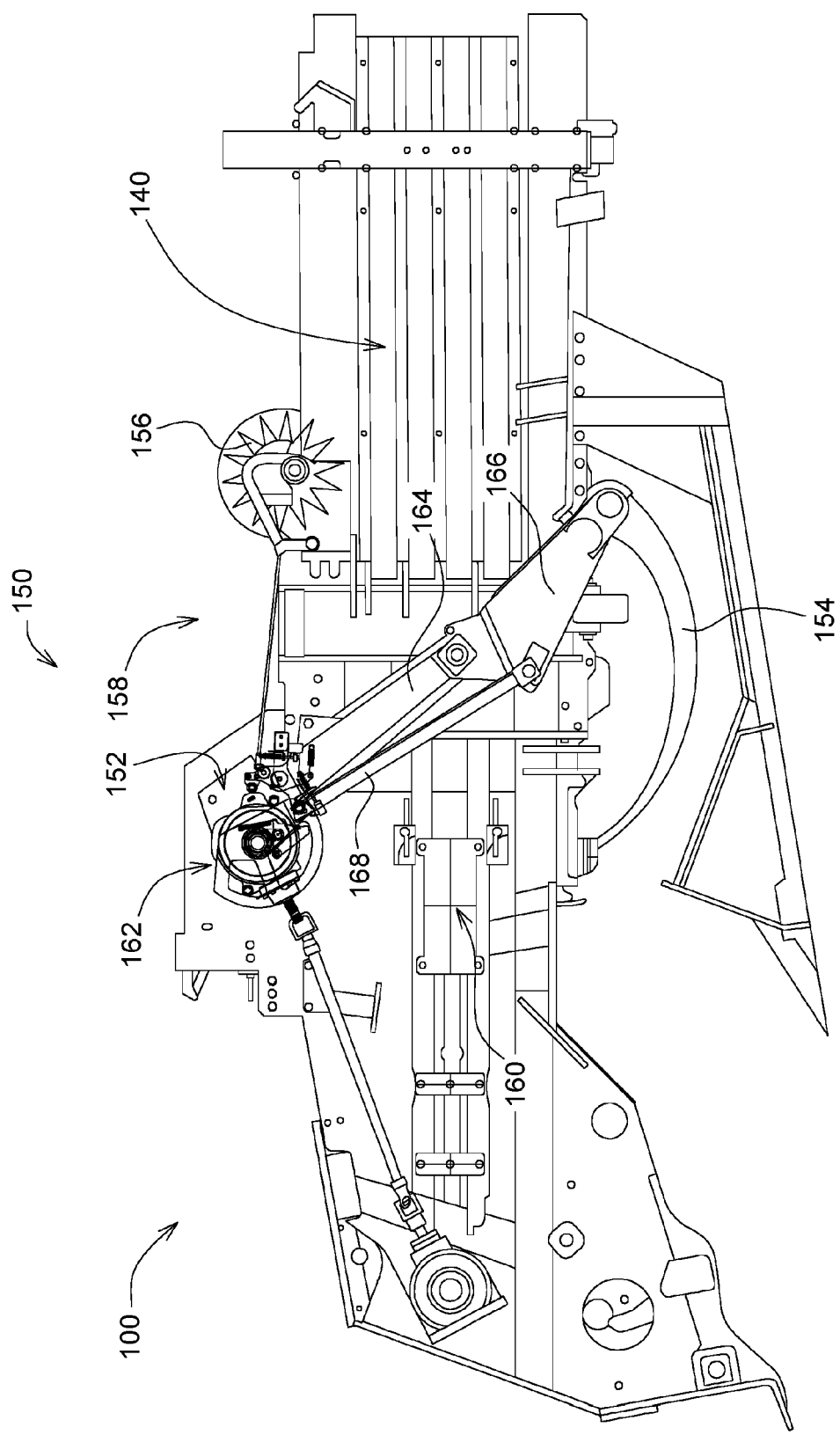
FIG. 3 is a side view of a portion of the agricultural harvesting machine of FIG. 1.

The binding system 150 can include a delivery mechanism 160 for moving the needles 154 from the lowered position to the raised position, as shown for example in FIG. 3. The delivery mechanism 160 can include a pivoting lift arm 162 and a support member 164 which pivotally supports a delivery or needle frame 166. One or more needles 154 can be connected to the needle frame 166. The needle frame 166 is connected to the lift arm 162 by a lift link 168. When the pivoting lift arm 162 rotates, the lift link assembly 172 raises the needle frame 166 and the connected needles 154 from the lowered position, as shown in FIG. 4, through an intermediate position, as shown in FIG. 5, to the raised position, as shown in FIG. 6.

Figure 4:
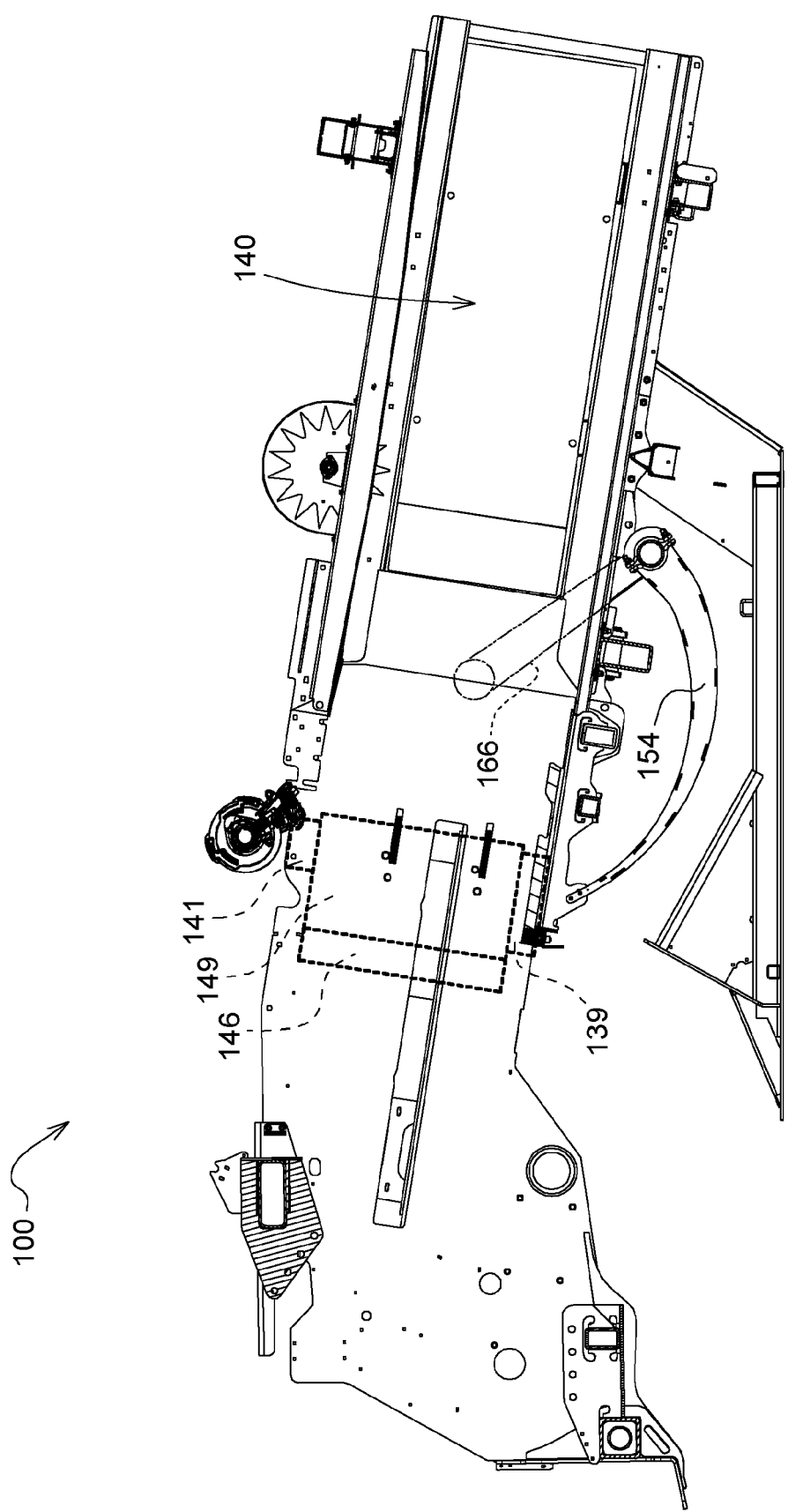
FIG. 4 is another side view of a portion of the agricultural harvesting machine of FIG. 1.
Figure 5:
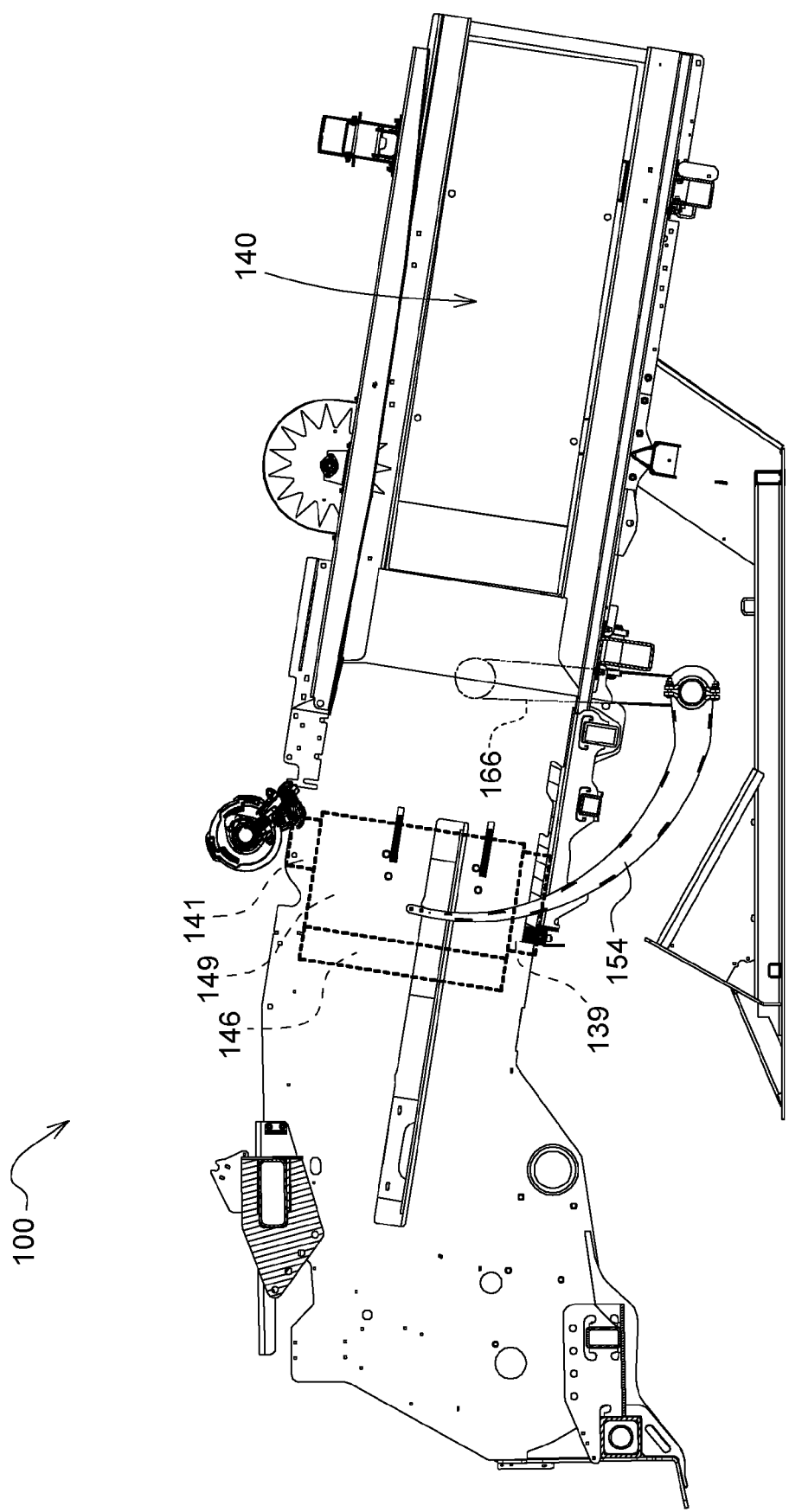
FIG. 5 is another side view of a portion of the agricultural harvesting machine of FIG. 1.
Figure 6:
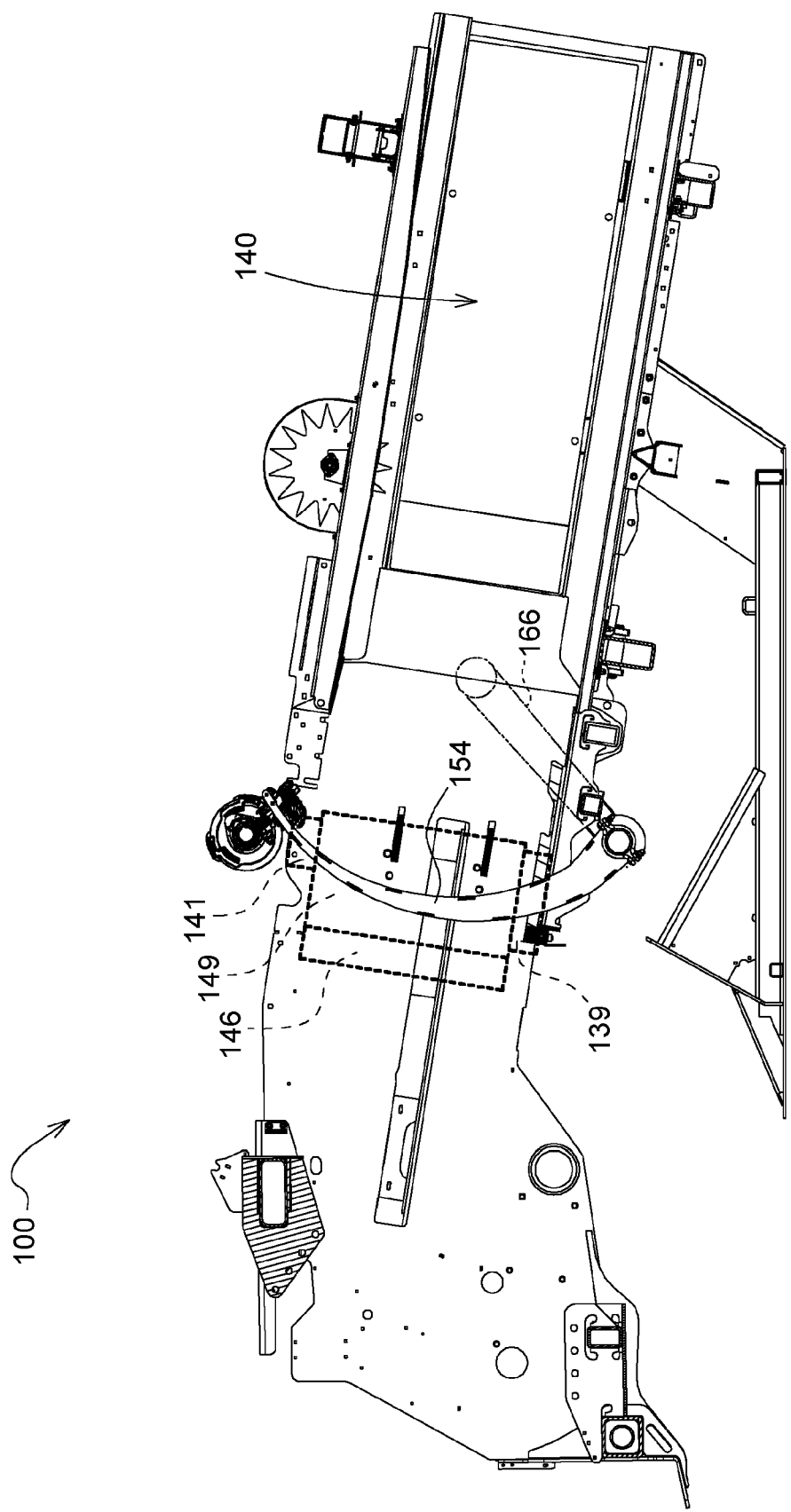
FIG. 6 is another side view of a portion of the agricultural harvesting machine of FIG. 1.

With reference to FIGS. 4-6, the delivery device 154 wraps binding material around at least a portion of the compressed crop or crop package and provides the binding material to the binding mechanism 152. The delivery device 154 remains in the lowered position as the crop material in the compression chamber 140 accumulates to pre-determined quantity, size, or amount. The binding system 150 activates and the delivery device 154 moves from the lowered position up through a slot 139 in the bottom of the compression chamber 140. The delivery device 154 continues to move upward through the compression chamber 140 in front of the crop material in the compression chamber 140. The delivery device 154 moves through a slot 149 located in a compression surface 147 of the plunger 146, which can be in contact with the crop material in the compression chamber 140. The delivery device 154 continues to move upward through the compression chamber 140 and through the slot 141 in the top of the compression chamber 140 to the binding mechanism 152. The delivery device 154 delivers the binding material to the binding mechanism 152, which secures the binding material around the compressed crop material within the compression chamber 140. The delivery device 154 then begins moving downward out of the slot 141 in the top of the compression chamber 140 and back through the compression chamber 140. The delivery device 154 moves downward out of slot 139 in the bottom of the compression chamber 140 and back to the lowered position.

Figure 7:
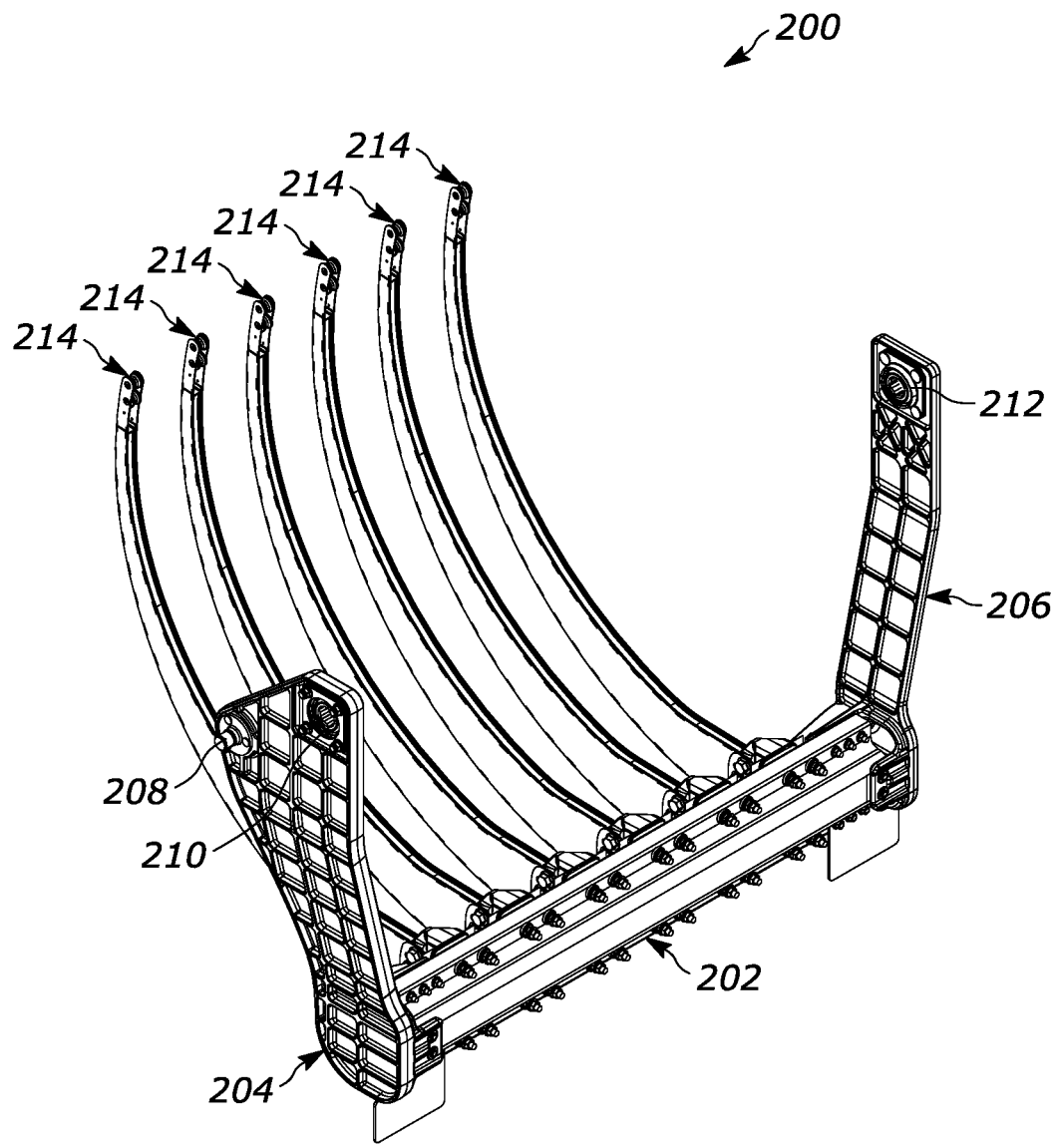
FIG. 7 is a perspective view of a needle frame assembly and a set of needles.

FIG. 7 shows an example of a needle frame assembly 200 according to an exemplary embodiment of the invention. The needle frame assembly 200 includes a yoke 202 and a pair of yoke arms 204, 206 connected to and extending from the yoke 202. In some embodiments, only a single yoke arm is used. The first yoke arm 204 includes a shaft 208 extending outwardly away from the arm and a first bearing mount 210. The shaft 208 connects to the lift link 168 and the bearing mount 210 pivotally connects to the support member 164. The second lift arm 206 includes a second bearing mount 212. A plurality of needles 214 are connected to the yoke 202.

Figure 8:
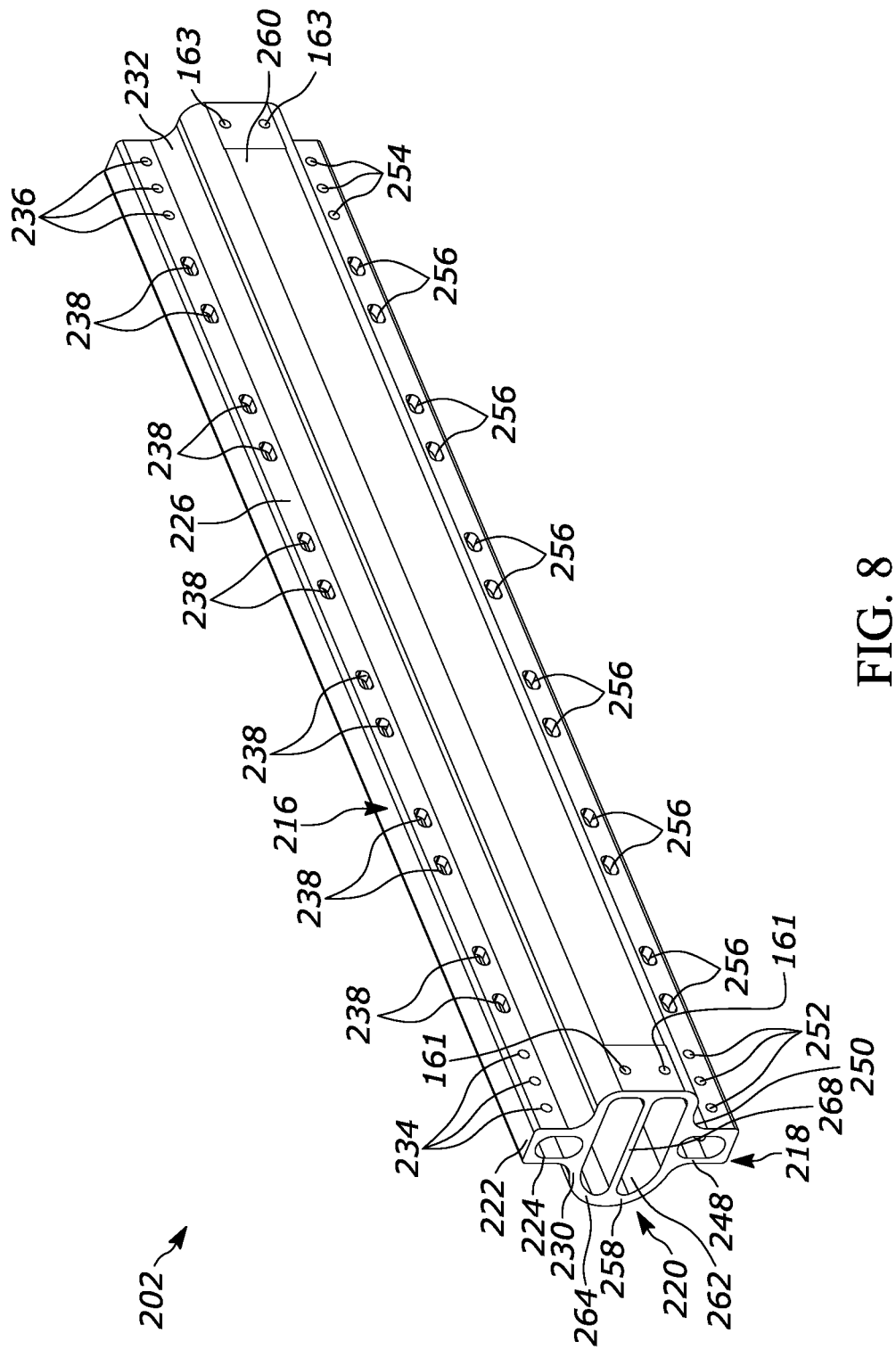
FIG. 8 is a perspective view of the yoke of the needle frame assembly of FIG. 7.
Figure 9:
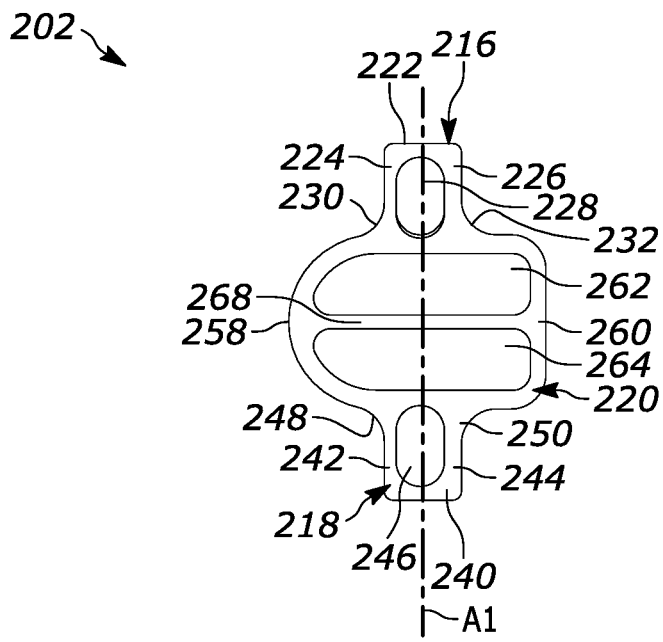
FIG. 9 is a side view of the yoke of FIG. 8.

As best shown in FIGS. 8 and 9, the yoke has an upper bar 216, a lower bar 218, and a central section 220 positioned between the upper bar 216 and the lower bar 218. The upper bar 216 can have a substantially rectangular outer configuration with a substantially rectilinear upper portion 222, a substantially rectilinear first outer portion 224, and a substantially rectilinear second outer portion 226. A first longitudinal opening 228 extends through the upper bar 216. The first opening 228 can have a substantially obround configuration. A curved first transition 230 connects the first outer portion 224 with the central section 220 and a curved second transition 232 connects the second outer portion 226 with the central section 220. One or more transverse openings can extend along the length of the upper bar 216. The transvers openings can include a first set of outer openings 234, a second set of outer openings 236, and a first set of central openings 238. The first and second outer openings 234, 236 receive fasteners to connect the arms 204, 206 to the yoke 202. The first central openings 238 receive fasteners to connect the needles 214 to the yoke 202.

Similar to the upper bar 216, the lower bar 218 can have a substantially rectangular outer configuration with a substantially rectilinear lower portion 240, a substantially rectilinear third outer portion 242, and a substantially rectilinear fourth outer portion 244. A second longitudinal opening 246 extends through the lower bar 218. The second longitudinal opening 246 can have a substantially obround configuration. A curved third transition 248 connects the third outer portion 242 with the central section 220 and a curved fourth transition 250 connects the fourth outer portion 244 with the central section 220. One or more transverse openings can extend along the length of the lower bar 218. The transverse openings can include a third set of outer openings 252, a fourth set of outer openings 254, and a second set of central openings 256. The third and fourth outer openings 252, 245 receive fasteners to connect the arms 204, 206 to the yoke 202. The second central openings 256 receive fasteners to connect the needles 214 to the yoke 202.

The central section 220 can have a substantially D-shaped configuration with a curvilinear front portion 258 facing the needles and a substantially rectilinear rear 260 portion opposite the front portion. The front portion 206 can blend into the first and third transitions 230, 248 and the rear portion 260 can blend into the second and fourth transitions 232, 250. A third longitudinal 262 opening and fourth longitudinal opening 264 extend through the central portion 220. The third and fourth openings 262, 264 can be separated by a central beam 268. The third and fourth openings 262, 264 can have a substantially bullnose configuration. A first set of rear openings 261 and a second set of rear openings 263 extend through the rear portion 260.

In certain embodiments, the size, shape, and configuration of the components of the yoke 202 discussed above can be varied from the illustrated embodiments.

Figure 10:
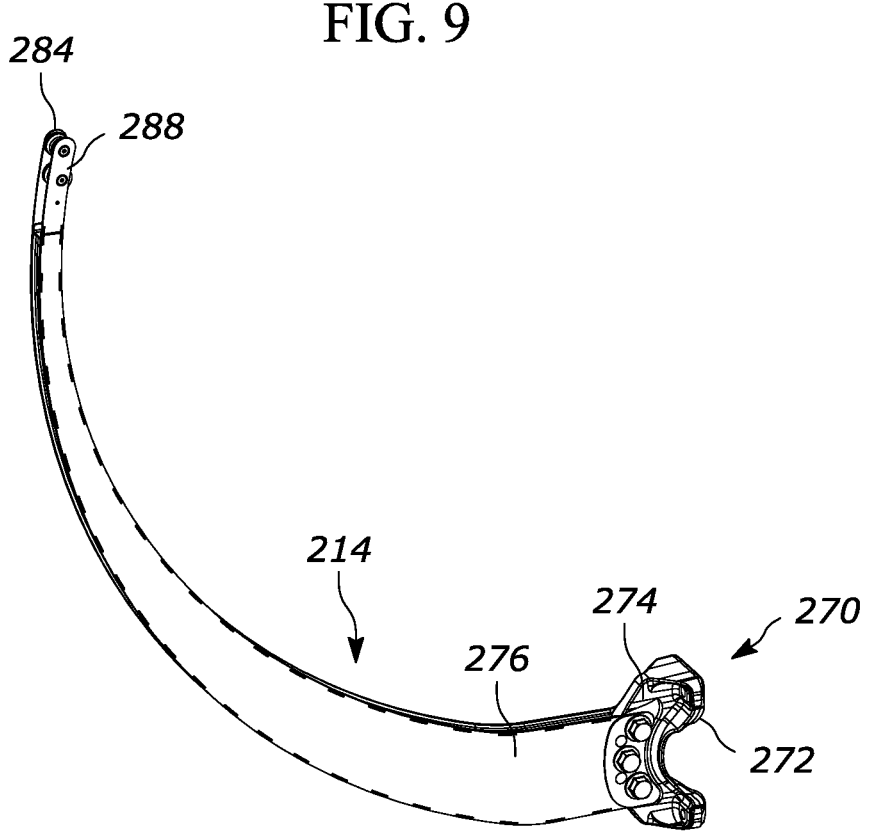
FIG. 10 is a perspective view of a needle and needle joint of FIG. 7.

FIG. 10 shows an exemplary needle joint 270 that connects to the yoke 202. The needle joint 270 includes a base 272 and a needle seat 274 that extends outwardly from the base 272. The base 272 connects to the yoke 202 and a shaft 276 of a needle 214 is connected to the needle seat 274. The opposite sides of the needle seat 274 can include a recessed portion 278 that receives the needle shaft 276. A set of openings 280 extend through the seat 276 to receive fasteners, for example bolts, that connect the needle 214 to the needle joint 270. A set of openings also extend through the base 272 to receive fasteners, for example bolts, that connect the needle joint 270 to the yoke 202. The shaft 276 of the needle 214 extends to a needle tip 282, which can include one or more rollers 284.

Figure 11:
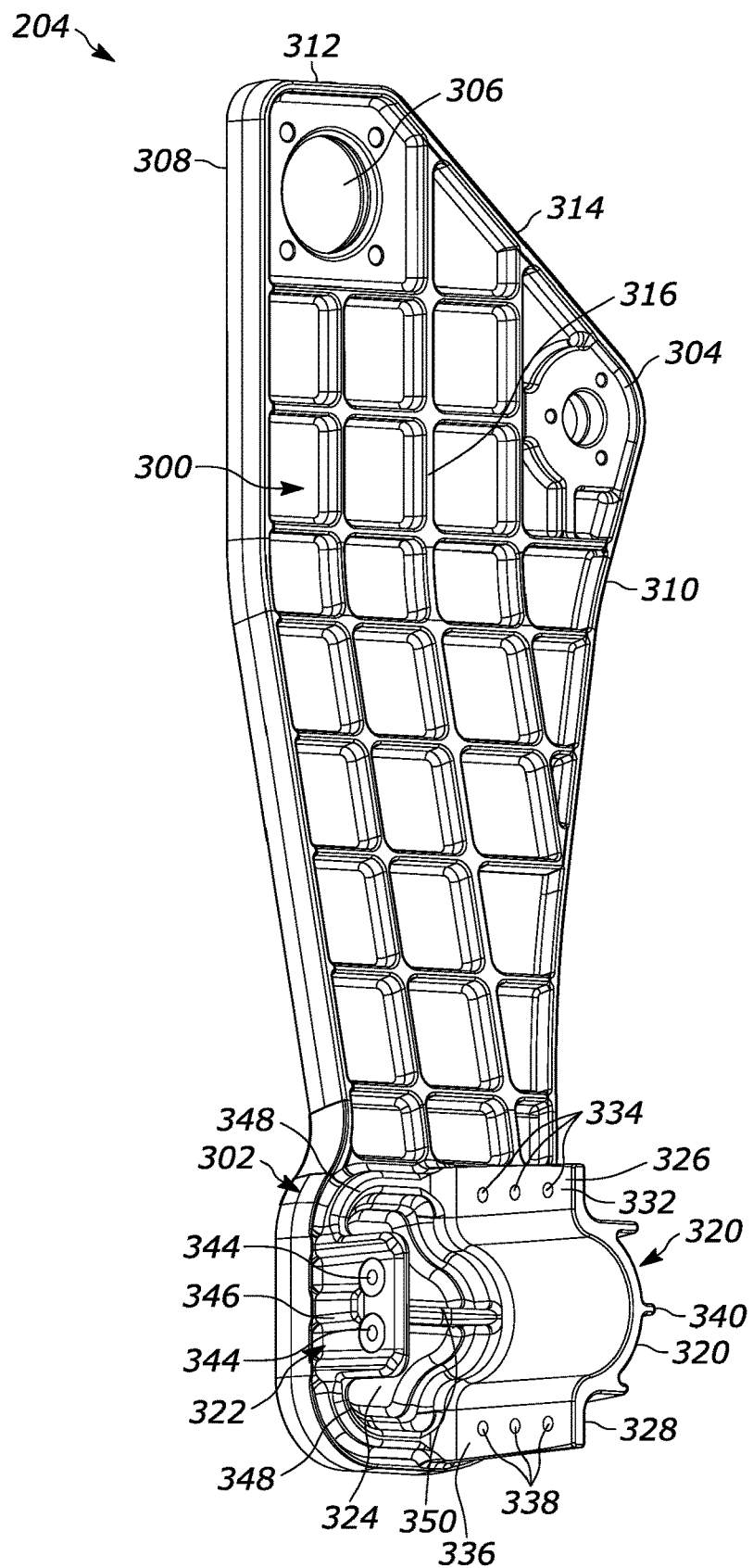
FIG. 11 is a perspective view of the first needle arm of the needle frame assembly of FIG. 7.
Figure 12:
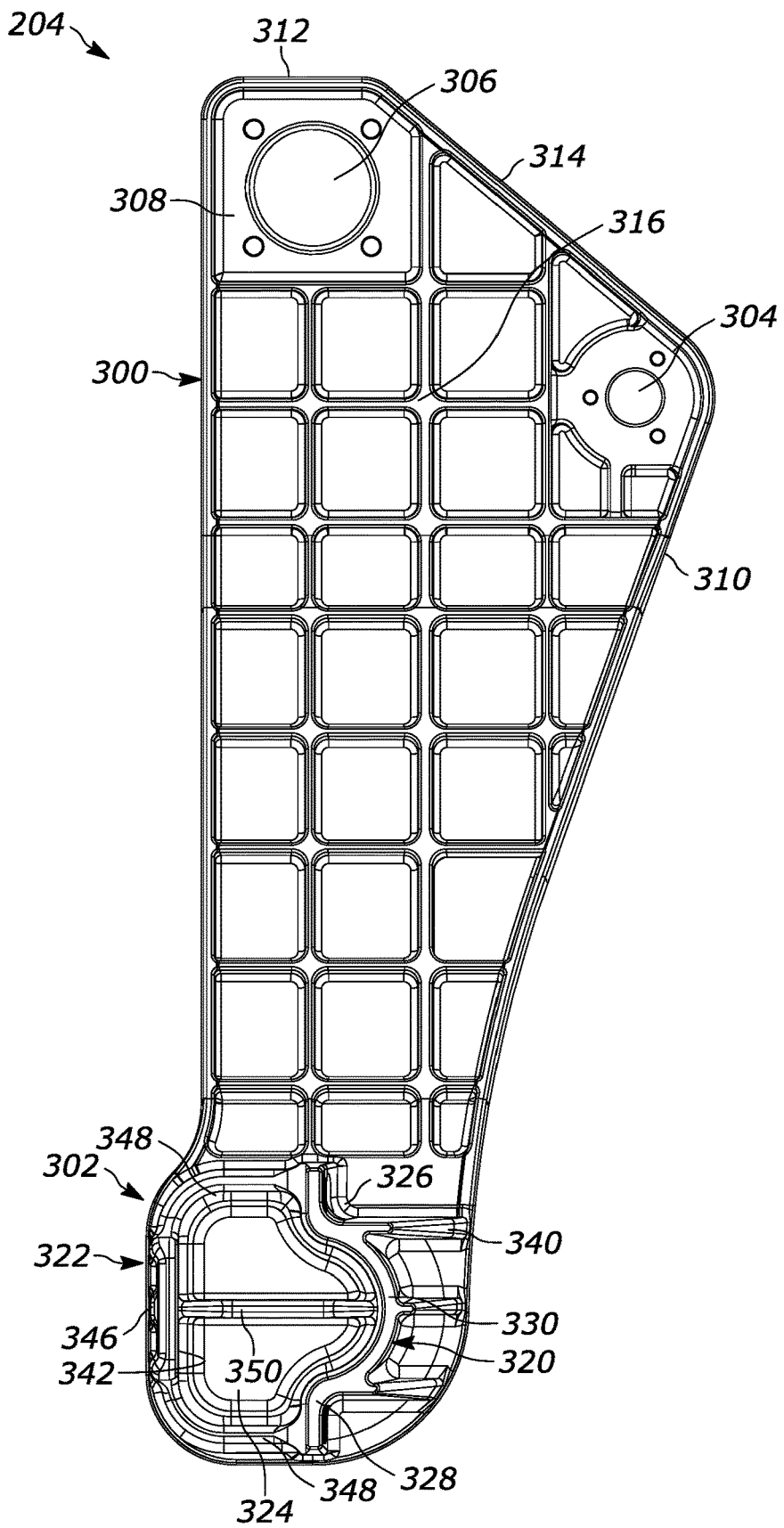
FIG. 12 is a side view of the first needle arm of FIG. 11.

FIGS. 11 and 12 show an exemplary first yoke arm 204 that includes a main body 300 and a yoke receiving portion 302. The main body 300 includes a first opening 304 to receive the shaft 208 and a second opening 306 to receive the first bearing mount 210. Both the shaft 208 and the bearing mount 210 can be connected by a series of fasteners (e.g., bolts). The main body 300 has a front edge 308 facing the needles 214 and a rear edge 310 positioned opposite the front edge 308. The rear edge 310 can have one or more curved portions transitioning toward the yoke receiving portion 302. A first upper edge 312 extends from the front edge 308. A second upper edge 314 extends at an oblique angle from the first upper edge 312 to the rear edge 310. A series of reinforcing ribs 316 can extend through the main body 300. The illustrated embodiment includes vertical and horizontal ribs 316 extending in a checkered pattern, however other rib patterns or no ribs can also be used depending on the structural requirements of the arm 204.

The yoke receiving portion 302 includes a front flange 320, a rear flange 322, and a recessed portion 324. The front flange 320 and the rear flange 322 are positioned on opposite sides of the recessed portion 324 and extend outwardly away from the main body 300. In an exemplary embodiment at least a portion of the front flange 320 and the rear flange 322 are disconnected and spaced from each other to define a non-continuous connection with the yoke 202.

The front flange 320 includes an upper portion 326, a lower portion 328, and a middle section 330. The upper portion 326 has a rectilinear configuration with an upper inner surface 332 configured to engage the upper bar 216 of the yoke 202. A set of upper openings 334 are formed in the upper portion 326 that align with the first outer openings 234 of the yoke 202. The lower portion 328 has a rectilinear configuration with a lower inner surface 336 configured to engage the lower bar 218 of the yoke 202. A set of lower openings 338 are formed in the lower portion 328 that align with the third outer openings 252 of the yoke 202. The middle section 330 has a curvilinear configuration and extends between the upper portion 326 and the lower portion 328. The spaced defined by the interior of the middle section 330 is configured to receive the front portion 258 of the yoke 202. One or more ribs 340 can be formed on the outer portion of the middle section 330 as best shown in FIG. 12.

The rear flange 322 has a rectilinear configuration with an inner surface 342 configured to engage the rear portion 260 of the yoke 202. A set of openings 344 are formed in the rear flange 322 that align with the first rear openings 261 of the yoke 202. One or more ribs 346 can be formed on the outer portion of the rear flange 322 as best shown in FIG. 11.

The recessed portion 324 is in part defined by the front flange 320, the rear flange 322 and an outer rim 348 that extends at least partially between the front flange 320 and the rear flange 322. A rib 350 extends substantially through the center of the recessed portion 324.

Figure 13:
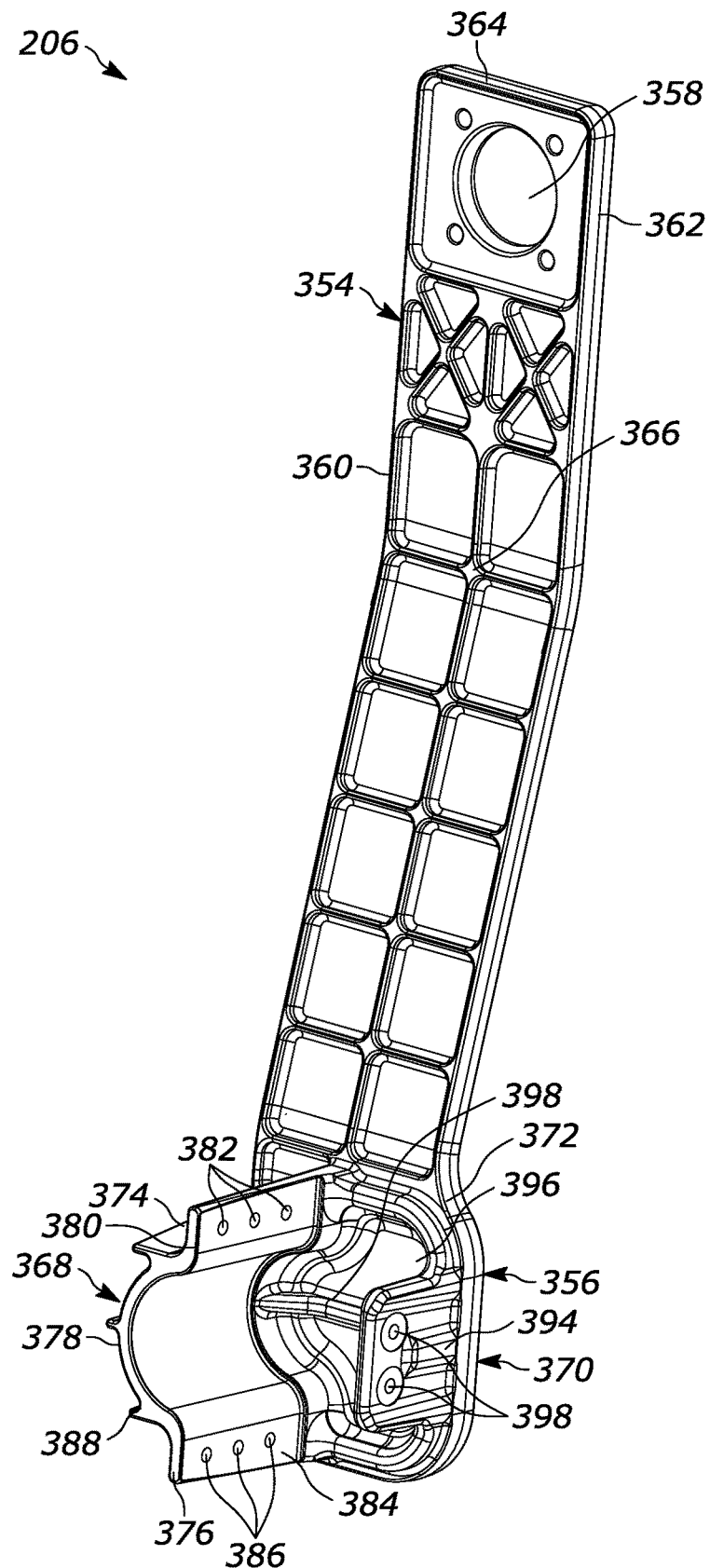
FIG. 13 is a perspective view of the second needle arm of the needle frame assembly of FIG. 7.
Figure 14:
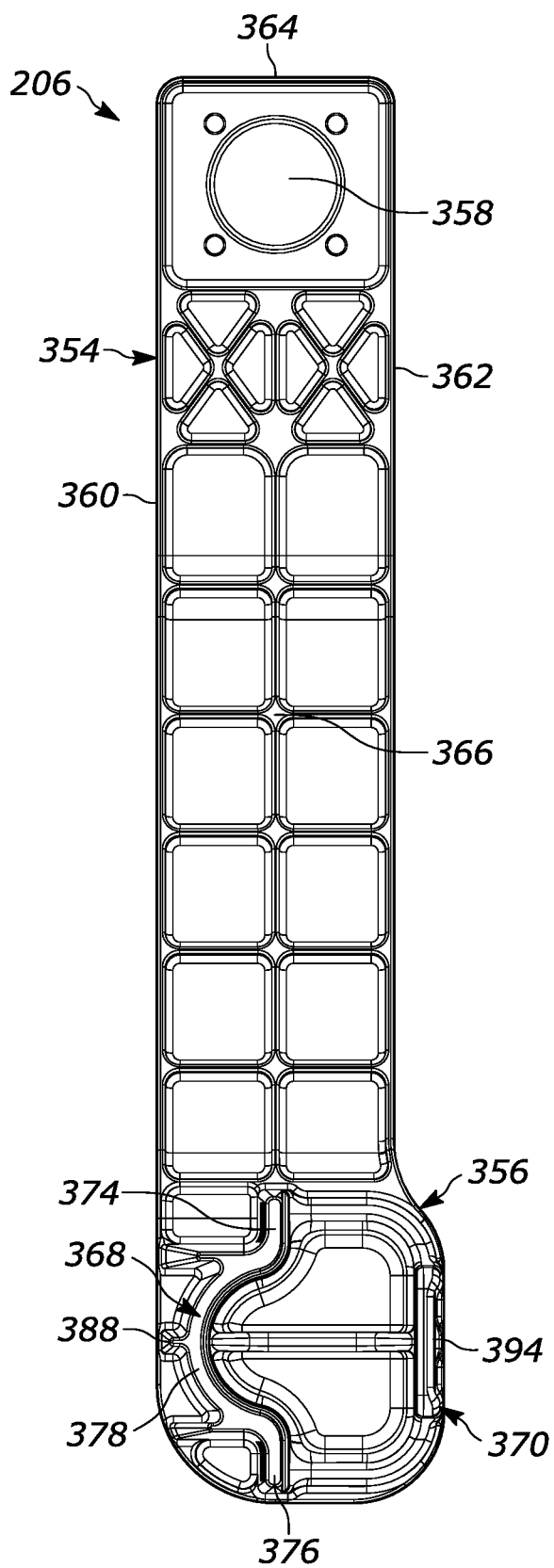
FIG. 14 is a side view of the second needle arm of FIG. 13.
Figure 15:
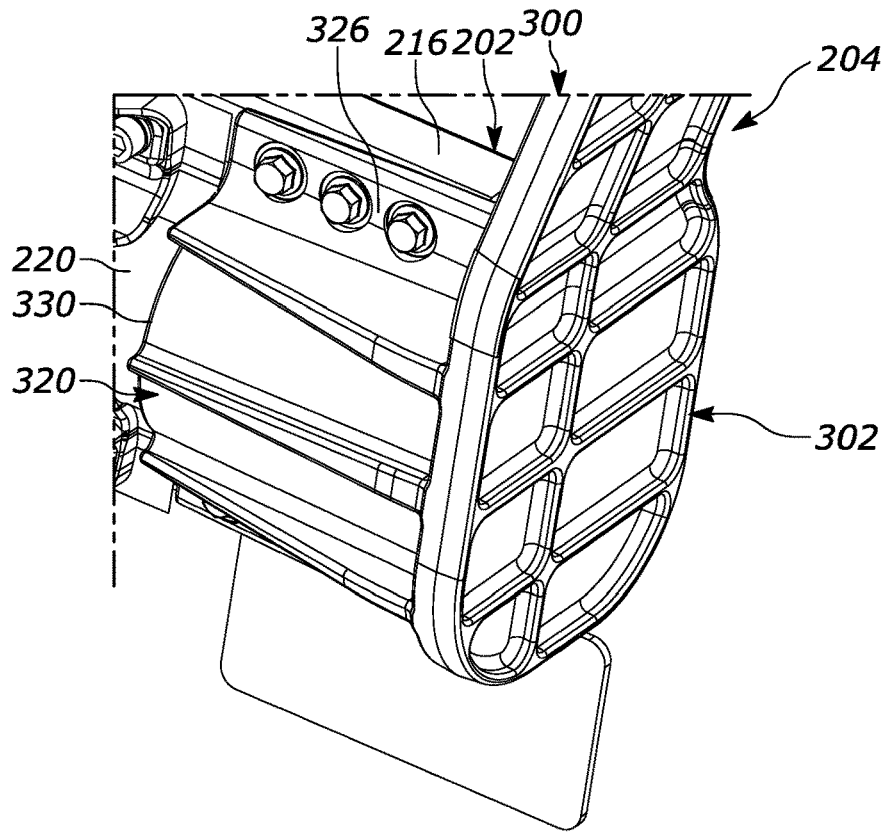
FIG. 15 is a partial, front view of the first needle arm connected to the yoke of FIG. 7.

FIGS. 13 and 14 show an exemplary second yoke arm 206 that includes a main body 354 and a yoke receiving portion 356. The main body includes an opening 358 to receive the second bearing mount 212. The second bearing mount 212 can be connected by a series of fasteners (e.g., bolts). The main body 354 has a front edge 360 facing the needles 214 and a rear edge 362 positioned opposite the front edge 360. An upper edge 364 extends between the front edge 360 and the rear edge 362. A series of reinforcing ribs 366 can extend through the main body 354. The illustrated embodiment includes vertical and horizontal ribs 366 extending in a checkered pattern, however other rib patterns or no ribs can also be used depending on the structural requirements of the arm 206.

The yoke receiving portion 356 includes a front flange 368, a rear flange 370, and a recessed portion 372. The front flange 368 and the rear flange 370 are positioned on opposite sides of the recessed portion 372 and extend outwardly away from the main body 354. In an exemplary embodiment at least a portion of the front flange 368 and the rear flange 370 are disconnected and spaced from each other to define a non-continuous connection with the yoke 202.

The front flange 368 includes an upper portion 374, a lower portion 376, and a middle section 378. The upper portion 374 has a rectilinear configuration with an upper inner surface 380 configured to engage the upper bar 216 of the yoke. A set of upper openings 382 are formed in the upper portion 374 that align with the second outer openings 236 of the yoke 202. The lower portion 376 has a rectilinear configuration with an inner surface 384 configured to engage the lower bar 218 of the yoke 202. A set of lower openings 386 are formed in the lower portion 376 that align with the fourth outer openings 254 of the yoke 202. The middle section 378 has a curvilinear configuration and extends between the upper portion 374 and the lower portion 376. The space defined by the interior of the middle section 378 is configured to receive the front portion 258 of the yoke 202. One or more ribs 388 can be formed on the outer portion of the middle section 378 as best shown in FIG. 14.

The rear flange 370 has a rectilinear configuration with an inner surface 390 configured to engage the rear portion 260 of the yoke 202. A set of openings 392 are formed in the rear flange 370 that align with the second rear openings 263 of the yoke 202. One or more ribs 394 can be formed on the outer portion of the rear flange 370 as best shown in FIG. 13.

The recessed portion 372 is in part defined the front flange 368, the rear flange 370 and an outer rim 396 that extends at least partially between the front flange 368 and the rear flange 370. A rib 398 extends substantially through the center of the recessed portion 372.

Figure 16:
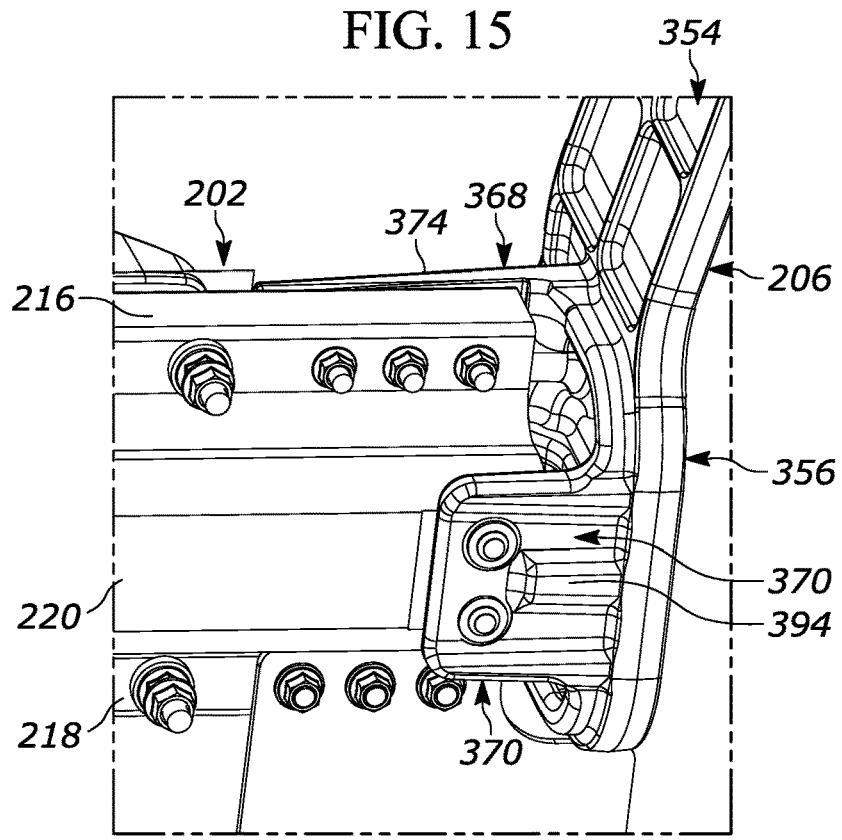
FIG. 16 is a partial, rear view of the second needle arm connected to the yoke of FIG. 7.
Figure 17:
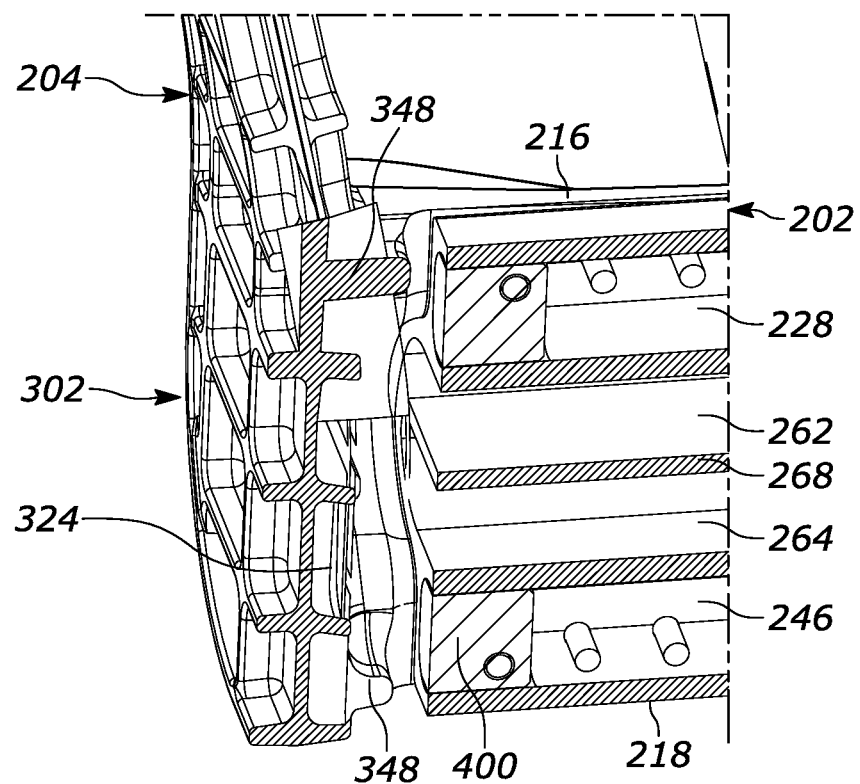
FIG. 17 is a sectional, rear view of the first needle arm connected to the yoke of FIG. 7.
Figure 18:
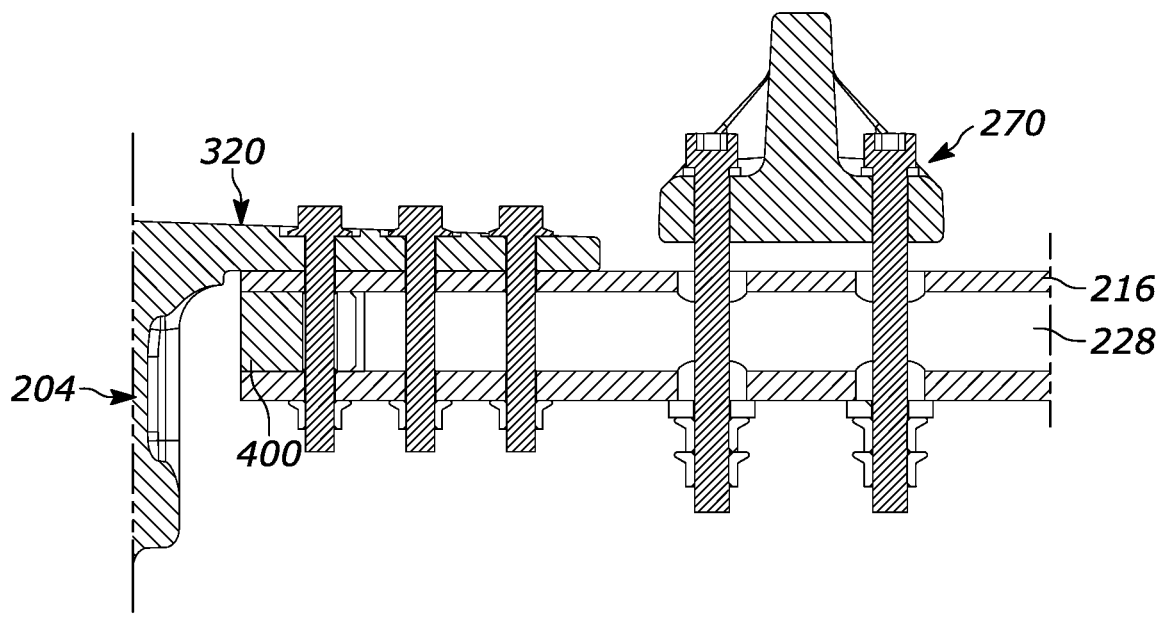
FIG. 18 is a sectional, top view of the first needle arm connected to the yoke of FIG. 7.

FIGS. 15-18 show the yoke 202 connected to the first and second yoke arms 204, 206. The yoke arms 204, 206 are engaged with the yoke 202 and connected with fasteners (e.g., bolts). As best shown in FIGS. 16 and 17, the ends of the yoke 202 can be seated on the rims 348, 396 extending around the recessed portions 324, 372 of the yoke arms 204, 206. The upper portions 326, 374 and lower portions 328, 376 of the front flanges 320, 368 are respectively engaged with the upper bar 216 and the lower bar 218 of the yoke 202, and the rear flanges 322, 370 are engaged with the rear portion of the central section 220. Fasteners are inserted through the openings in upper portions 326, 374, lower portions 328, 376, and rear flanges 322, 370 and into the respective openings in the yoke 202 to secure the yoke arms 204, 206 to the yoke 202. In some embodiments, the yoke arms 204, 206 can be connected to the yoke 202 through a joining method (e.g., adhesive bonding, welding, etc.) instead of or in addition to using fasteners.

In some embodiments, inserts 400 can be positioned inside of the first and second longitudinal openings 228, 246. The inserts 400 can be formed separately from the yoke 202, or can be integrally formed therewith. The inserts 400 can be used to help prevent deformation (e.g., rotation, yielding) of the components such as the yoke during operation under high loads. The inserts 400 can be formed from aluminum or steel and placed into the yoke 202 in conjunction with the attachment of the yoke arms 204, 206.

The yoke 202 and yoke arms 204, 206 should exhibit sufficient strength, stiffness, and/or rigidity through the operating cycle so that the needles 214 maintain their relative position during operation. Additionally, because of the rapid movement of the delivery device 154 during each cycle, the mass of the yoke 202 and yoke arms 204, 206 should be minimized to reduce the momentum of the delivery device 154 during its cycle to reduce stress on the various components and reduce cycle time. While the needle frame 200 components are typically made from a steel member having a cylindrical or rectangular cross-section and welded components, such steel yokes are heavy, which increases the momentum during a cycle, thereby increasing the stress on the components of the delivery device 154, as well as slowing the cycle time. Other lighter materials, such as aluminum, do not exhibit the material properties required to form the yoke using the traditional cross-sectional shapes in the same general dimensions previously utilized by steel yokes, i.e. square or cylindrical. The design of the yoke 202 and yoke arms 204, 206 and the connection there-between enables the yoke 202 and yoke arm 204, 206 to be manufactured from extruded aluminum, instead of steel, while maintaining the same generally exterior dimensions of traditional yokes. The yoke 202 and yoke arms 204, 206 described herein, when manufactured from aluminum and due to their unique shapes, reduces weight while increasing the stiffness relative to traditional steel components, allowing for greater structural integrity with a reduced momentum during movement of the needle assembly 200.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. An agricultural harvesting machine comprising:
  a binding mechanism configured to secure binding material around crop material formed into a crop package; and
  a delivery device configured to wrap binding material around a portion of the crop package and provide binding material to the binding mechanism;
  wherein the delivery device includes a needle connected to a needle frame, the needle frame includes a yoke and a first arm extending from the yoke;
  the yoke includes a central section, an upper bar extending from the central section, and a lower bar extending from the central section;
  the first arm includes a main body and a yoke receiving portion; and
  the yoke receiving portion includes a front flange connected to the yoke and a rear flange separately couple to the yoke.

2. The agricultural harvesting machine of claim 1, wherein the front flange includes an upper portion connected to the upper bar, a lower portion connected to the lower bar, and a middle section receiving the central section.

3. The agricultural harvesting machine of claim 1, wherein the central section has a substantially D-shaped configuration with a curvilinear front portion facing the needle and a rectilinear rear portion opposite the front portion and wherein the rear flange is couple to the rear portion.

4. The agricultural harvesting machine of claim 1, wherein the upper bar includes a transverse first outer opening and the lower bar includes a transverse second outer opening, and wherein the first arm is connected to the yoke through a fastener extending through the first outer opening and a fastener extending through the second outer opening.

5. The agricultural harvesting machine of claim 1, wherein the upper bar includes longitudinal first chamber, the lower bar includes a longitudinal second chamber, and the central section includes a longitudinal third chamber separate from the first chamber and the second chamber, and wherein a first insert is positioned in the first chamber proximate the first arm and a second insert is positioned in the second chamber proximate the first arm.

6. The agricultural harvesting machine of claim 1, wherein the yoke and the first arm are formed from aluminum.

7. The agricultural harvesting machine of claim 1, wherein at least a portion of the front flange and the rear flange are disconnected and spaced from each other to define a non-continuous connection with the yoke.

8. An agricultural harvesting machine comprising:
  a binding mechanism configured to secure binding material around crop material formed into a crop package; and
  a delivery device configured to wrap the binding material around a portion of the crop package and provide the binding material to the binding mechanism;
  wherein the delivery device includes a needle connected to a needle frame;
  the needle frame includes a yoke extending between a first arm and a second arm, wherein the first and second arms extending from the yoke;
  the yoke includes an upper bar having a longitudinal first chamber, a lower bar having a longitudinal second chamber, and a central section positioned between the upper bar and the lower bar;
  the first arm includes a main body and a yoke receiving portion; and
  the yoke receiving portion includes a front flange connected to the upper bar by a first fastener and connected to the lower bar by a second fastener and a rear flange connected to the central section by a third fastener.

9. The agricultural harvesting machine of claim 8, further comprising a first insert positioned in the first chamber and a second insert positioned in the second chamber, wherein the first fastener extends through the first insert and a second fastener extends through the second insert.

10. The agricultural harvesting machine of claim 8, wherein the first fastener is a bolt.

11. The agricultural harvesting machine of claim 8, wherein the central section has a substantially D-shaped configuration with a curvilinear front portion facing the needle and a rectilinear rear portion opposite the front portion, and wherein the front flange includes a middle section having a curvilinear configuration receiving the front portion.

12. The agricultural harvesting machine of claim 8, wherein the first and second chambers have a substantially obround configuration.

13. The agricultural harvesting machine of claim 8, wherein at least a portion of the front flange and the rear flange are disconnected and spaced from each other to define a non-continuous connection with the yoke.

14. An agricultural harvesting machine comprising:
  a binding mechanism configured to secure binding material around crop material formed into a crop package; and
  a delivery device configured to wrap the binding material around a portion of the crop package and provide binding material to the binding mechanism;
  wherein the delivery device includes a needle connected to a needle frame, the needle frame includes a yoke extending between a first arm and a second arm, wherein the first and second arms extending from the yoke;
  the yoke includes a substantially D-shaped configuration with a curvilinear front portion facing the needle and a rectilinear rear portion opposite the front portion;
  the first arm includes a main body and a yoke receiving portion; and
  the yoke receiving portion includes a front flange having a curvilinear section receiving the front portion and a rear flange connected to the rear portion.

15. The agricultural harvesting machine of claim 14, wherein the yoke includes an upper bar extending above the front portion and a lower bar extending below the front portion, and wherein the front flange includes an upper portion connected to the upper bar and a lower portion connected to the lower bar.

16. The agricultural harvesting machine of claim 15, wherein the upper bar includes longitudinal first chamber and the lower bar includes a longitudinal second chamber, and wherein a first insert is positioned in the first chamber proximate the first arm and a second insert is positioned in the second chamber proximate the first arm.

17. The agricultural harvesting machine of claim 16, wherein a first fastener extends through the front flange, the first insert, and the upper bar to couple the first arm to the yoke.

18. The agricultural harvesting machine of claim 14, wherein the yoke receiving portion includes a recessed portion.

19. The agricultural harvesting machine of claim 18, wherein the front flange and the rear flange are positioned on opposite sides of the recessed portion.

20. The agricultural harvesting machine of claim 18, wherein a rim extends at least partially around the recessed portion.

\* \* \* \* \*